Jan. 16, 1945.    C. A. RICH ET AL    2,367,613
BEARING
Filed Aug. 5, 1942    3 Sheets-Sheet 2

Inventors
CHARLES A. RICH
CHARLES A. RICH, JR.

By Albert G. Blodgett
Attorney

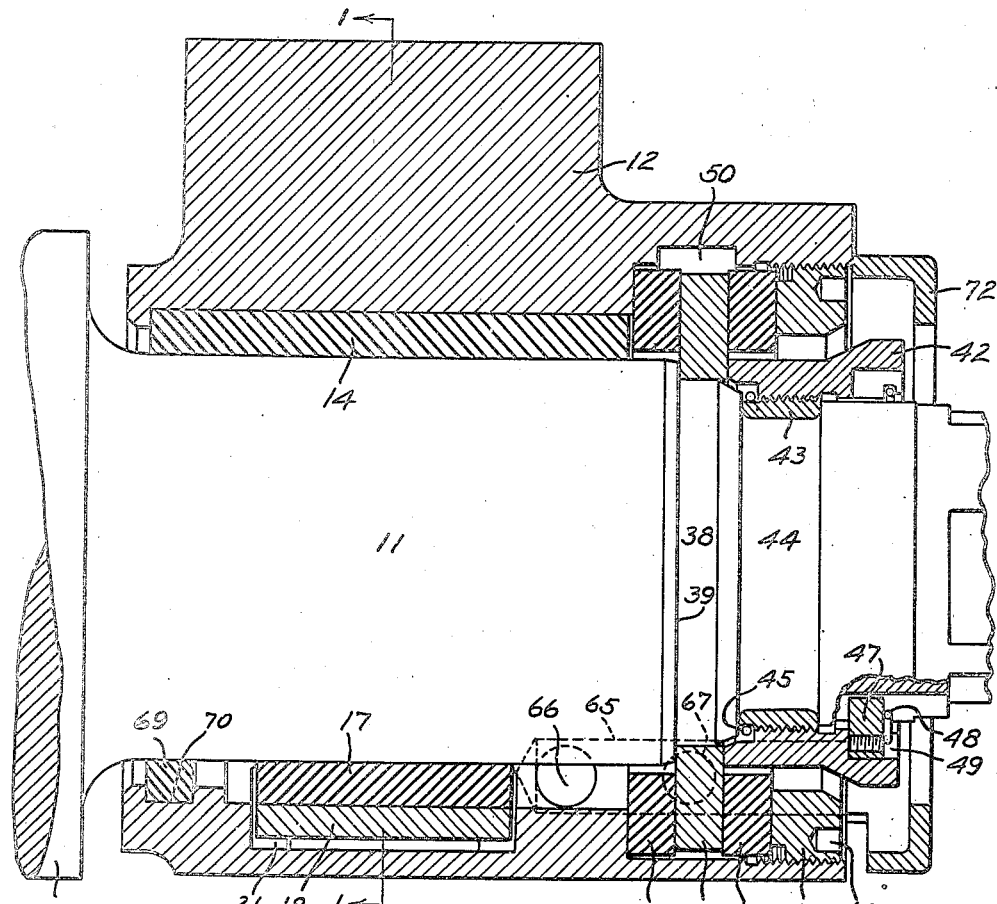
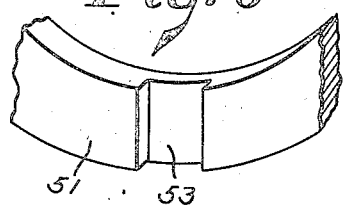
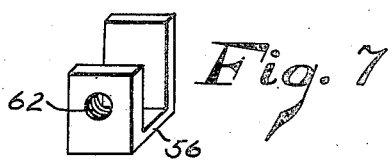

Patented Jan. 16, 1945

2,367,613

UNITED STATES PATENT OFFICE 2,367,613

BEARING

Charles A. Rich and Charles A. Rich, Jr., Worcester, Mass., assignors to Morgan Construction Company, Worcester, Mass., a corporation of Massachusetts Application August 5, 1942, Serial No. 453,634

10 Claims. (Cl. 308—8)

This invention relates to bearings, and more particularly to the construction and arrangement of bearings for supporting the necks of rolling mill rolls and the like.

It has been proposed heretofore to construct such bearings with replaceable liners of phenolic resins and similar non-metallic materials capable of operating with reasonable satisfaction when flooded with water and without other provision for lubrication and cooling. Bearings of this type have certain advantages in simplicity and relatively low cost of manufacture. However, they do not operate with true fluid film lubrication, and the non-metallic liners are accordingly subject to considerable wear. This introduces serious problems in the construction of the bearings to ensure the continuance of satisfactory operation despite such wear. In particular it is important to hold the roll neck at all times in proper contact with the liner which receives the radial load, and it is important to provide ample adjustment to compensate for wear of the thrust-receiving liner rings while at the same time holding these rings firmly to prevent them from rotating. Prior bearings have been seriously lacking in these requirements.

It is accordingly one object of the invention to provide a comparatively simple and inexpensive roll neck bearing of the water-lubricated type which will have a relatively long life of useful service.

It is a further object of the invention to provide a roll neck bearing having a non-metallic radially loaded liner, with a simple and compact mechanism for maintaining the roll neck in contact with the liner despite extensive wear thereof.

It is a further object of the invention to provide a roll neck bearing having non-metallic thrust rings, with means effective to prevent rotation of the rings even after they have become largely worn away in service.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a transverse cross-section through a bearing mounted upon a roll neck, the section being taken on the line 1—1 of Fig. 5;

Fig. 5 is a section taken on the line 5—5 of Fig. 3, the roll neck being shown in full;

Fig. 6 is a perspective view of a portion of a thrust ring; and

Fig. 7 is a perspective view of a key.

The embodiment illustrated comprises a rolling mill roll 10 having a cylindrical roll neck 11. The particular roll shown is the upper roll of a 2-high horizontal mill. The roll neck 11 is surrounded by a hollow bearing chock or casing 12 which is adapted to be mounted in the window of the usual mill housing (not shown).

Figure 1:
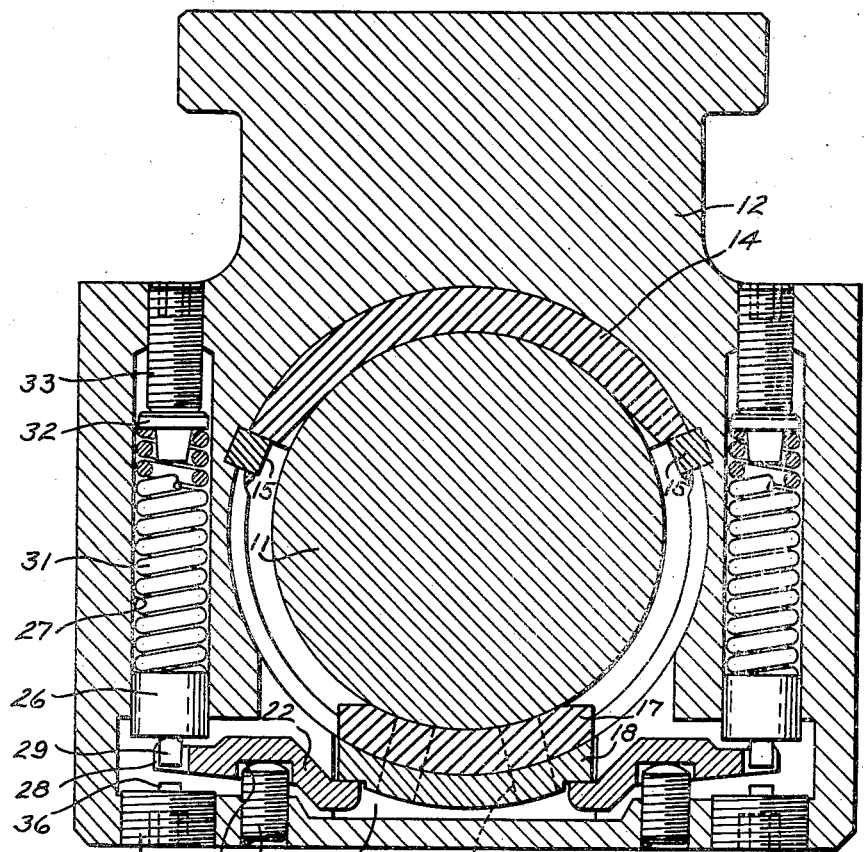
Figure 2:
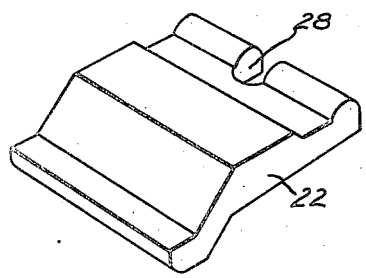
Fig. 2 is a perspective view of a lever forming part of the bearing.
Figure 3:
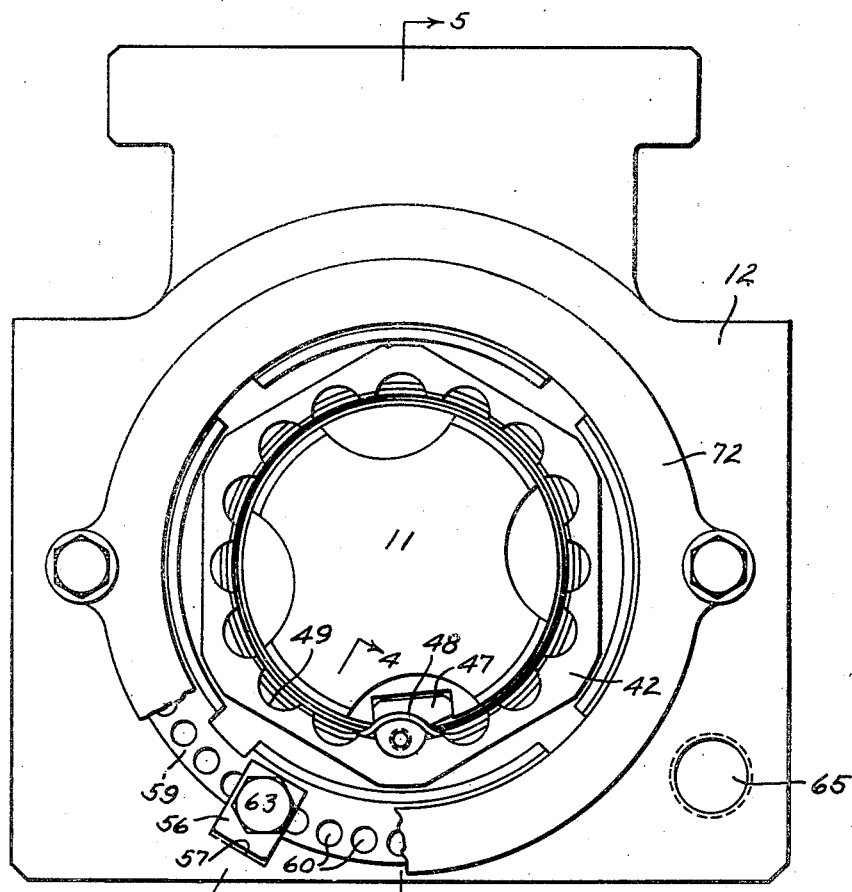
Fig. 3 is an end elevation of the roll neck and bearing, partially broken away.

Within the interior of the chock 12 there is provided a liner plate 14 of phenolic resin or other suitable non-metallic material which engages the top of the roll neck 11 to receive the heavy radial load resulting from the rolling operation. As shown in Fig. 1, this plate 14 is arcuate in shape, with its edges engaging a pair of metal bars 15 which are welded or otherwise secured to the chock. This construction allows the liner plate to be withdrawn and replaced by sliding it in the axial direction.

Means is provided to hold the roll neck firmly against the concave surface of the plate 14 and, in the case of the upper roll, to support the weight of the roll, so that there will be no jumping of the rolls as the stock enters or leaves the roll pass. For this purpose an arcuate shoe 17 of phenolic resin is mounted beneath the roll neck and in contact therewith, this shoe being secured to the upper surface of a metal plate 18 by means of dowel pins 19 of phenolic resin. This plate 18 is located within a recess 21 formed in the bottom of the chock and shaped to retain the plate in its proper position while permitting vertical movements thereof. The lateral portions of the plate rest upon the adjacent inner ends of two levers 22 which are fulcrumed intermediate their lengths upon the upper ends of two vertical screws 23 (Fig. 1). These screws are threaded through the bottom wall of the chock and welded thereto to hold them in place. The upper ends of the screws enter sockets 24 in the bottom surfaces of the levers. The outer ends of the levers are engaged by cylindrical plungers 26 which are slidably mounted in the lower ends of two vertical bores 27 formed in the chock 12 on opposite sides of the roll neck. As illustrated, each lever is provided with a notch 28 to receive a small projecting lug 29 on the lower end of the associated plunger. The plungers are urged downwardly by powerful coiled compression springs 31 mounted in the bores 27, the upper ends of the springs engaging buttons 32 which in turn are supported by vertical recessed-head screws 33 mounted in the chock, the lower ends of these screws extending into the bores 27. In this construction there is ample room to provide the springs with a considerable number of coils, so that the spring load will not vary greatly as the plate 14 wears away in service. When necessary, the springs may readily be adjusted by turning the screws 33.

It is desirable to relieve the shoe 17 of all the spring load when the bearing is to be removed from the roll neck. For this purpose a recessed head screw 35 is mounted in the bottom wall of the chock directly beneath each of the plungers 26. Each screw is provided with an upwardly projecting central lug 36. This construction is such that by turning the screws 35 the operator can bring the lugs 36 into contact with the lugs 29 and force the plungers 26 upwardly to compress the springs 31. This will rock the levers 22 and lower the plate 18 and the shoe 17, so that the bearing can be withdrawn from the roll neck or replaced thereon. The screws 35 are larger in diameter than the bores 27, so that the buttons 32, springs 31 and plungers 26 may be inserted in the bores through the threaded openings before the screws are placed in position.

Referring now to Fig. 5, it will be seen that the roll neck 11 is formed with a portion 38 which is reduced slightly in diameter to provide a shoulder 39. A metal ring 40 is suitably keyed to the portion 38 and held firmly against the shoulder 39 by means of a nut 42 which surrounds a threaded ring 43 mounted in a groove 44 in the roll neck and keyed thereto. For assembly purposes this threaded ring is divided along an axial plane into two pieces which are retained in the groove 44 by means of a garter spring 45. In order to prevent the nut 42 from loosening in service it is secured to the roll neck by a key 47 which is held in place by a wire snap ring 48. This key is arranged to engage any one of a series of notches 49 formed in the nut 42. The chock 12 is provided with a recess 50 extending radially outward for a substantial distance beyond the peripheries of the annular members 51 and 52 and located directly above the ring 40 in position to receive this ring and to prevent it from making contact with the chock as the liner plate 14 wears away.

Figure 4:
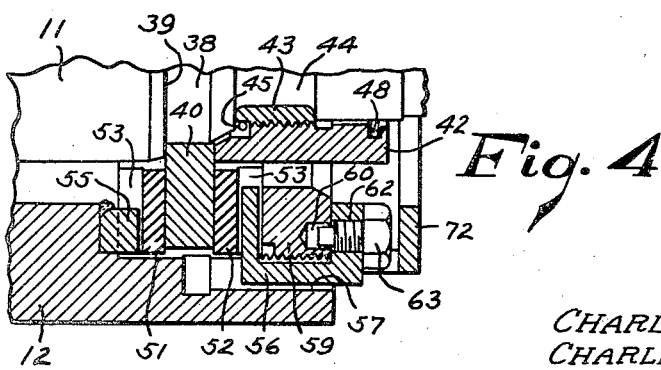
Fig. 4 is a section taken on the line 4—4 of Fig. 3.

The metal ring 40 is provided on its opposite sides with plane surfaces forming shoulders for sliding engagement with an inner thrust ring 51 and an outer thrust ring 52 suitably mounted within the chock 12. These thrust rings are formed of phenolic resin or other suitable nonmetallic material, and because of the nature of this material it is important to provide ample area for contact with the keys which are employed to prevent rotation of the rings. It is also important to provide means for adjusting the parts to compensate for wear on the bearing faces of the thrust rings while maintaining adequate key-contacting areas. For this purpose each of the thrust rings 51 and 52 is provided on the face opposite its bearing face with a notch or groove 53 of rectangular cross-section extending in the radial direction. The notch 53 in the inner ring 51 fits over a key 55 (Fig. 4) which is welded or otherwise fixed to the chock 12 while the notch in the outer ring 52 receives a key 56 which is slidably mounted in a keyway 57 in the chock. Preferably the two thrust rings are of the same size and shape so that they are interchangeable. The outer thrust ring 52 is held in place by an adjusting ring 59 having external screw threads for engagement with internal screw threads in the chock. This ring 59 is provided in its outer face with a series of circumferentially spaced openings 60. The key 56 is preferably of U-shape, with its two branches straddling the ring 59, the outer branch having a tapped hole 62 therethrough to receive a screw 63. The inner end of this screw projects into one of the openings 60 to prevent the adjusting ring 59 from turning.

The bearing is supplied with water in order to cool and lubricate the sliding surfaces. For this purpose the chock 12 is provided with a longitudinally extending main passage 65 having two laterally extending branches 66 and 67 (Fig. 5). The branch 66 discharges water into the space adjacent the cylindrical surface of the roll neck 11, and the branch 67 discharges water into the space around the outside of the ring 40. The water will escape from both ends of the bearing. In order to prevent too rapid a discharge of water from the inner end of the bearing, an arcuate sealing device 69 (Fig. 5) of phenolic resin is mounted in a groove 70 in the chock, beneath the inner portion of the roll neck. A splash guard 72 is mounted on the outer end of the chock to catch water which is thrown off centrifugally from the nut 42.

The operation of the invention will now be apparent from the above disclosure. While stock is traveling through the mill, the radial bearing load caused by the rolling pressure will be received directly on the liner plate 14, and if there is any thrust load it will be applied to one or the other of the thrust rings 51 and 52. When no stock is between the rolls, the roll neck 11 will nevertheless be held firmly against the plate 14 by the springs 31, which will apply force through the levers 22 to the plate 18 and shoe 17. These springs are sufficiently long to maintain an adequate pressure even after the plate 14 has become seriously worn. The pressure can of course be adjusted easily by means of the screws 33. When the bearing is to be removed from the roll neck or replaced thereon, the screws 35 will be adjusted inwardly to receive the spring load and remove all pressure from the shoe 17. Any wear which occurs on the bearing faces of the thrust rings 51 and 52 can be taken up by removing the screw 63 and turning the threaded ring 59 inwardly the required amount, whereupon the screw 63 will be replaced to enter one of the openings 60 and lock the ring in position. Since the notches 53 extend only part way through the thrust rings, these rings can wear away to a great extent and in fact to approximately one-half their original thickness before the ring 40 can make contact with either of the keys 55 or 56. Regardless of this wear, the thrust rings will have the same ample area in engagement with the keys to prevent the rings from rotating.

It will be understood that the same bearing can be used for the lower roll as for the upper roll. The lower bearing will of course be inverted as compared with the upper bearing, in order to receive the downwardly directed rolling pressure.

For convenience certain of the claims include descriptive words such as "horizontal," "upright," "top," "bottom" and the like, but it will be understood that such and similar words are not to be considered as limitations except as they define the relative positions of the various parts, since the entire bearing may be inverted or otherwise shifted from the position shown in the drawings.

Having thus described our invention, what we claim as new and desire to secure by Letters Patent is:

1. A bearing for a rotatable roll neck or the like comprising a hollow chock surrounding the roll neck, a plate mounted within the chock and having a concave surface for contact with one side of the roll neck to receive the rolling pressure, a shoe mounted within the chock for contact with the opposite side of the roll neck, spring means mounted within the chock and arranged to urge the shoe inwardly against the roll neck, and means mounted on the chock and movable into position to receive the load of the spring means and relieve the shoe from such load when the bearing is to be removed from or replaced on the roll neck.

2. A bearing for a rotatable roll neck or the like comprising a hollow chock surrounding the roll neck, a plate mounted within the chock and having a concave surface for contact with one side of the roll neck to receive the rolling pressure, a shoe mounted within the chock for contact with the opposite side of the roll neck, two coiled compression springs mounted within the chock on opposite sides of the roll neck, levers connecting the springs with the shoe to urge the shoe inwardly against the roll neck, and fulcrums pivotally supporting the levers intermediate their lengths.

3. A bearing for a horizontal rotatable roll neck or the like comprising a hollow chock surrounding the roll neck, a plate mounted within the chock above the roll neck and having a concave lower surface for contact with the top of the roll neck, a shoe mounted within the chock beneath the roll neck, two upright coiled compression springs mounted within the chock on opposite sides of the roll neck, levers connecting the lower ends of the springs with the shoe to urge the shoe upwardly against the bottom of the roll neck, and fulcrums pivotally supporting the levers intermediate their length.

4. A bearing for a horizontal rotatable roll neck or the like comprising a hollow chock surrounding the roll neck, a plate mounted within the chock above the roll neck and having a concave lower surface for contact with the top of the roll neck, a shoe mounted within the chock beneath the roll neck, two upright coiled compression springs mounted within the chock on opposite sides of the roll neck, levers connecting the lower ends of the springs with the shoe to urge the shoe upwardly against the bottom of the roll neck, and devices mounted within the chock beneath the springs and movable into position to force the lower ends of the springs upwardly and thereby relieve the shoe from the spring load when the bearing is to be removed from or replaced on the roll neck.

5. A bearing for a horizontal rotatable roll neck or the like comprising a hollow chock surrounding the roll neck, a plate mounted within the chock above the roll neck and having a concave lower surface for contact with the top of the roll neck, a shoe mounted within the chock beneath the roll neck, two upright coiled compression springs mounted within the chock on opposite sides of the roll neck, levers connecting the lower ends of the springs with the shoe to urge the shoe upwardly against the bottom of the roll neck, and an upright screw mounted in the chock beneath each spring, the screws being adjustable upwardly to force the lower ends of the springs upwardly and thereby relieve the shoe from the spring load when the bearing is to be removed from or replaced on the roll neck.

6. A bearing for a horizontal rotatable roll neck or the like comprising a hollow chock surrounding the roll neck, a plate mounted within the chock above the roll neck and having a concave lower surface for contact with the top of the roll neck, a shoe mounted within the chock beneath the roll neck, the chock having two upright bores therein on opposite sides of the roll neck, an upright coiled compression spring in each bore, and two horizontal levers mounted in the lower portion of the chock and fulcrumed intermediate their ends, the outer ends of the levers receiving the downward pressure of the springs and the inner ends of the levers extending beneath the adjacent lateral portions of the shoe to urge the shoe upwardly against the bottom of the roll neck.

7. A bearing for a horizontal rotatable roll neck or the like comprising a hollow chock surrounding the roll neck, a plate mounted within the chock above the roll neck and having a concave lower surface for contact with the top of the roll neck, a shoe mounted within the chock beneath the roll neck, the chock having two upright bores therein on opposite sides of the roll neck, an upright coiled compression spring in each bore, adjustable screws in the upper ends of the bores to receive the upward pressure of the springs, and two horizontal levers mounted in the lower portion of the chock and fulcrumed intermediate their ends, the outer ends of the levers receiving the downward pressure of the springs and the inner ends of the levers extending beneath the adjacent lateral portions of the shoe to urge the shoe upwardly against the bottom of the roll neck.

8. A bearing for a rotatable roll neck or the like comprising a hollow chock surrounding the roll neck, a plate of phenolic resin or similar material mounted within the chock and having a concave surface for contact with one side of the roll neck to receive the rolling pressure, a metal ring surrounding the roll neck and secured thereto to provide a shoulder, and an annular member of phenolic resin or similar material mounted within the chock in contact with the shoulder to receive the thrust of the roll, the chock having a recess therein extending radially outward for a substantial distance beyond the periphery of the said annular member and adapted to receive the metal ring as the said plate gradually wears away.

9. A bearing for a rotatable roll neck or the like comprising a hollow chock surrounding the roll neck, a plate mounted within the chock and having a concave surface for contact with one side of the roll neck to receive the rolling pressure, a ring surrounding the roll neck and secured thereto, the ring being located outwardly with respect to the said plate and providing an outwardly facing shoulder, an annular member mounted within the chock in contact with the said shoulder and having a groove in its outer face extending in a generally radial direction, the chock having an internally threaded opening in its outer end provided with a keyway, an externally threaded ring mounted in the opening and providing an adjustable abutment for engagement with the outer face of the annular member, and a key mounted in the keyway and having a portion which extends into the said groove to prevent rotation of the annular member.

10. A bearing for a rotatable roll neck or the like comprising a hollow chock surrounding the roll neck, a plate mounted within the chock and having a concave surface for contact with one side of the roll neck to receive the rolling pressure, a ring surrounding the roll neck and secured thereto, the ring being located outwardly with respect to the said plate and providing an outwardly facing shoulder, an annular member mounted within the chock in contact with the said shoulder and having a groove in its outer face extending in a generally radial direction, the chock having an internally threaded opening in its outer end provided with a keyway, an externally threaded ring mounted in the opening and engaging the outer face of the annular member, a U-shaped key mounted in the keyway in straddling relation to the threaded ring, the inner branch of the key extending into the said groove to prevent rotation of the annular member, and means whereby the outer branch of the key may be secured to the threaded ring at various positions of adjustment thereof.

CHARLES A. RICH.
CHARLES A. RICH, Jr.